United States Patent
Yin

[15] 3,684,370
[45] Aug. 15, 1972

[54] ENLARGING DEVICE FOR DIRECT-VISION THREE-DIMENSIONAL PICTURES

[72] Inventor: Law Chi Yin, Tokyo, Japan
[73] Assignee: Asahi Stereorama Co. Ltd., Tokyo, Japan
[22] Filed: Feb. 3, 1970
[21] Appl. No.: 8,274

[52] U.S. Cl. .................... 355/71, 355/74, 355/75
[51] Int. Cl. ........................................... G03b 27/58
[58] Field of Search .................... 355/75, 76, 71, 74

[56] References Cited

UNITED STATES PATENTS

| | | | |
|---|---|---|---|
| 3,194,114 | 7/1965 | Weinberg | 355/75 |
| 2,589,825 | 3/1952 | Kneitel | 355/75 |
| 2,150,974 | 3/1939 | Huebner | 355/75 X |

*Primary Examiner*—Samuel S. Matthews
*Assistant Examiner*—Richard A. Wintercorn
*Attorney*—Tab T. Thein

[57] ABSTRACT

Enlarging device for direct-vision three-dimensional pictures, including an enlarger head incoporating an accurately positionable film carrier and an easel, with a device for mounting a photographic film, a lenticular screen positioned thereover, and a mechanism for moving the screen in increments relative to the film.

5 Claims, 16 Drawing Figures

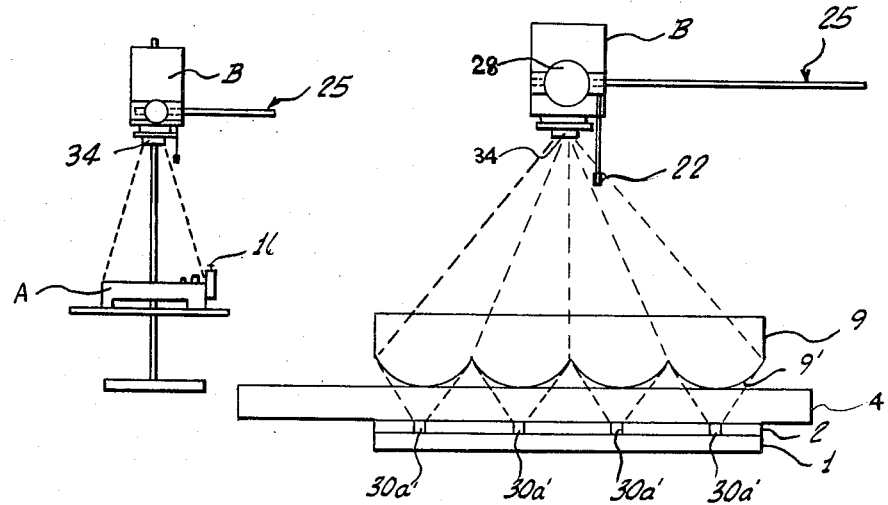

ENLARGING DEVICE FOR DIRECT-VISION THREE-DIMENSIONAL PICTURES

The present invention relates to a photographic enlarging device for assembling direct-vision three-dimensional pictures. Such pictures comprise a lenticular viewing screen having a surface shaped into a number of parallel lens elements, and a specially compiled print converted from a set formed from a number of separate two-dimensional images taken by a special camera. The latter forms the subject matter of another application which will be identified somewhat later.

Each set of these images comprises views of a given scene taken from several different angles, and they are processed into a three-dimensional linear-form picture, by the aid of the present device. If the lenticular screen and the print are in optically correct registry, these separate two-dimensional images are reproduced to provide a direct-vision three-dimensional picture of the scene.

One object of the present invention is to make a precision-built film carrier to hold the projecting film imaged, i.e., the film having a set of two-dimensional scenes.

Another object is to construct a precision-built special three-dimensional composing easel wherein the film to be exposed is positioned under a lenticular screen which is indexed between the exposure of each frame of the set of two-dimensional negatives.

The present application is closely related with the following inventions on which patent applications are being filed simultaneously by the same inventor (and assigned to the same company): "Camera for Taking Direct-Vision Three-Dimensional Pictures" Ser. No. 8272, as referred to earlier in the specification, "-Method of Making Direct-Vision Three-Dimensional Film", Ser. No. 8273, and "Embossing and Laminating Device and Method for Direct-Vision Three-Dimensional Pictures", Ser. No. 8275. Certain details of the disclosures will not be repeated in the other applications, and thus reference may be had to one or more of the correlated applications as the descriptions proceed.

Having thus generally described the invention, reference will now be made to the accompanying drawings, illustrating a preferred practical embodiment, and in which FIG. 1 is a front elevation of an enlarging device for direct-vision three-dimensional pictures according to the present invention, with a vertical pole mounting both an enlarger head and a special easel;

FIGS. 14, 15 and 16 schematically illustrate the principle of producing a print for a direct-vision three-dimensional picture from the images.

Figure 5:
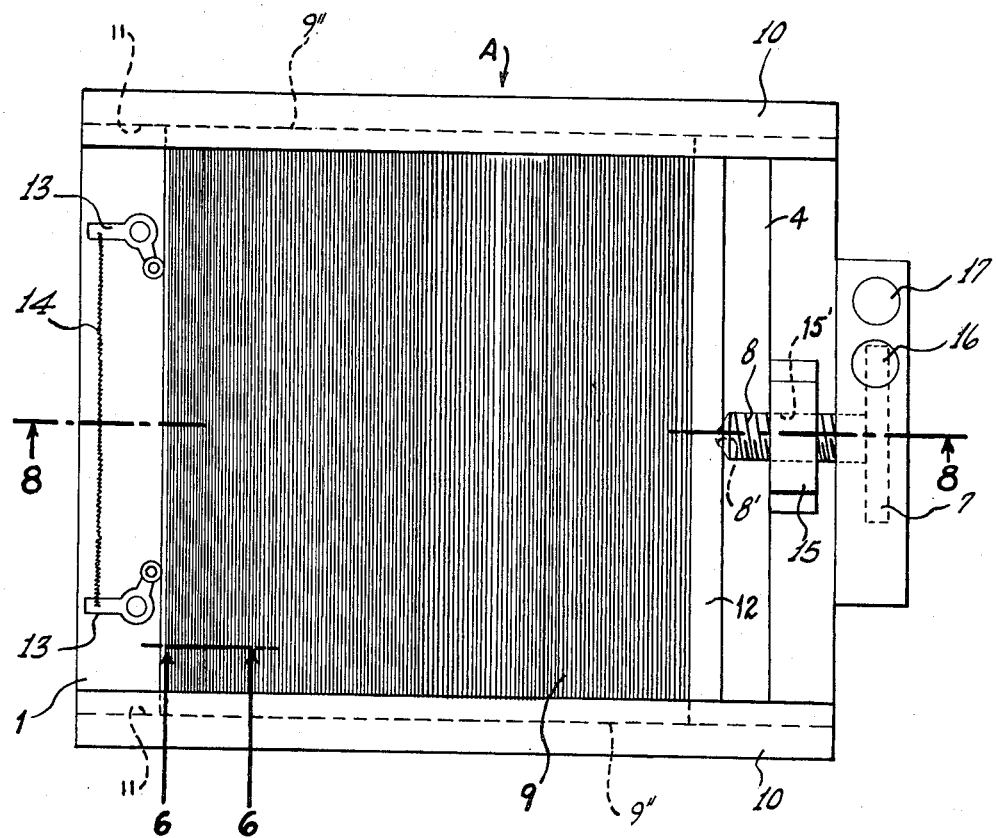
FIG. 5 is a plan view of the special easel in larger size.
Figure 6:
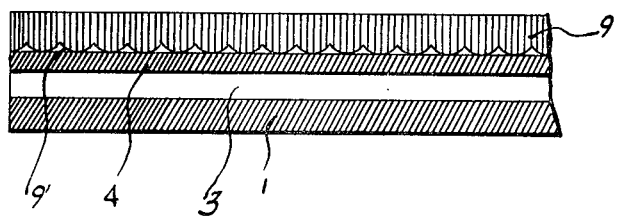
FIG. 6 is a sectional view on line 6 — 6 of FIG. 5.
Figure 7:
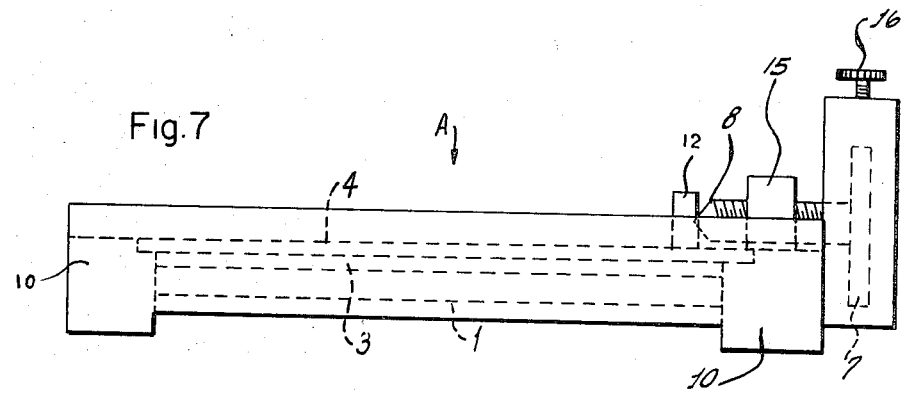
FIG. 7 is a front elevation view of FIG. 5.
Figure 8:
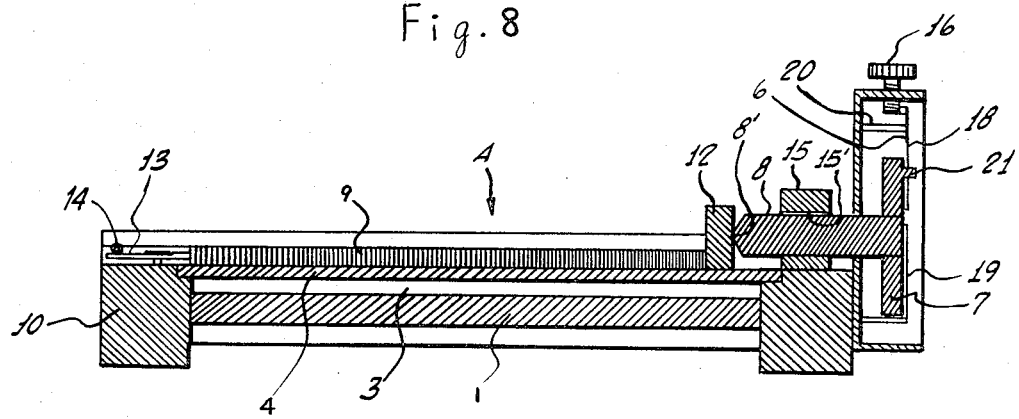
FIG. 8 is a sectional view on the line 8 — 8 of FIG. 5.

The exemplary embodiment of the invention includes a special easel A having a backing plate 1 supporting a photosensitive film 2 (see FIG. 15). A glass sheet 4 overlies backing plate 1 with sufficient space 3 (FIG. 6) for insertion of the film therebetween, and a lenticular screen 9 is supported on glass sheet 4. Screen 9 has a plurality of lenticular lenses 9' on the surface thereof which contacts glass sheet 4 (see FIGS. 5, 6 and 8). Lenticular screen 9 is engaged on its side edge by a plate 12 which is contacted by a screw spindle 8 at a point 8' thereof in a boss 15, upstanding from base 1, so that screen 9 may be shifted on glass sheet 4 by advancing screw spindle 8 by turning an increment wheel 7.

An easel frame 10 connected with backing plate 1 provides a pair of grooves 11 to guide two side edges 9'' of screen 9 during the shifting movement. The other side edge of screen 9 is pressed toward plate 12 by toggle arms 13 biased toward the same by a tension spring 14. Screw spindle 8 is threaded in engagement with a hole 15' in boss 15.

Figure 4:
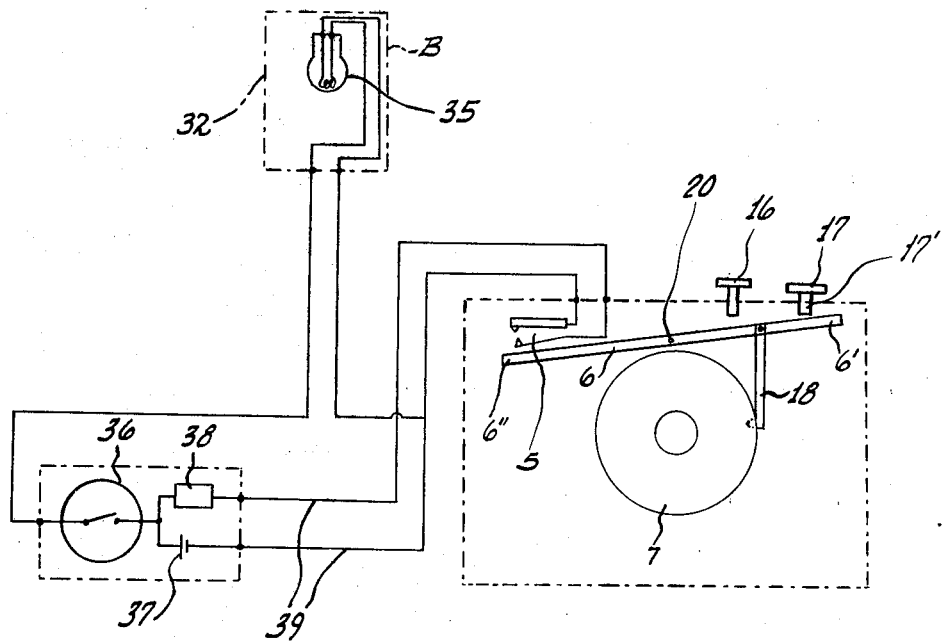
FIG. 4 is a diagram of an electric circuit installed in the enlarging device.
Figure 9:
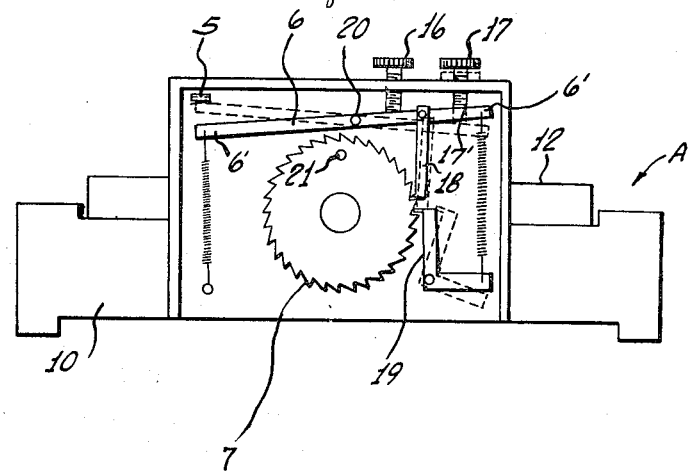
FIG. 9 is a right-hand side view of FIG. 7.
Figure 10:
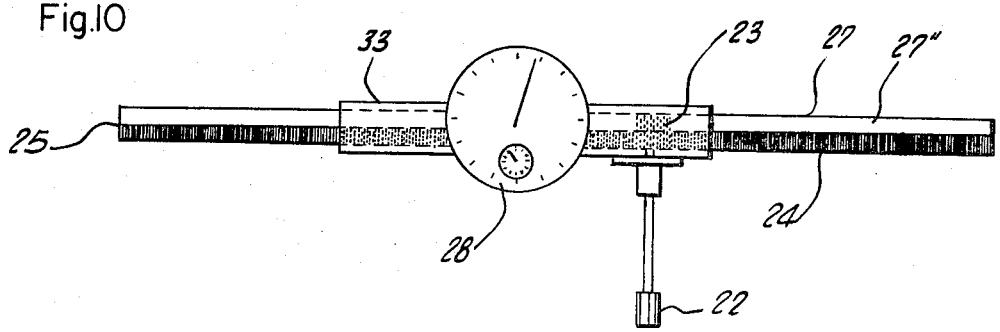
FIG. 10 is a front elevation of a film carrier to be held in the enlarger head.
Figure 11:
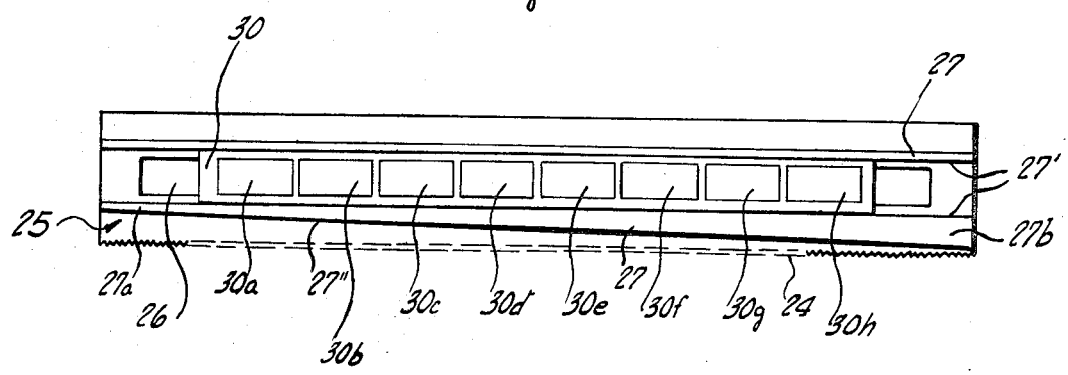
FIG. 11 is a plan view of FIG. 10 with both a micrometer and the carrier holder broken away.

Increment wheel 7 is rotated by a thumb piece 17 linked with a lever 6 having pawl 18 which engages and moves each tooth of wheel 7 one by one. Lever 6 is pivoted on a pin 20. A setting knob 16 adjusts the counterclockwise movement of lever 6 about pin 20. One end 6'' of lever 6 actuates a microswitch 5 (FIG. 4) which controls the exposure time of a light-source lamp 35. A ratchet 19 engages each tooth of wheel 7. The latter is provided with a manual operating handle 21 (see FIGS. 8 and 9).

Figure 1:
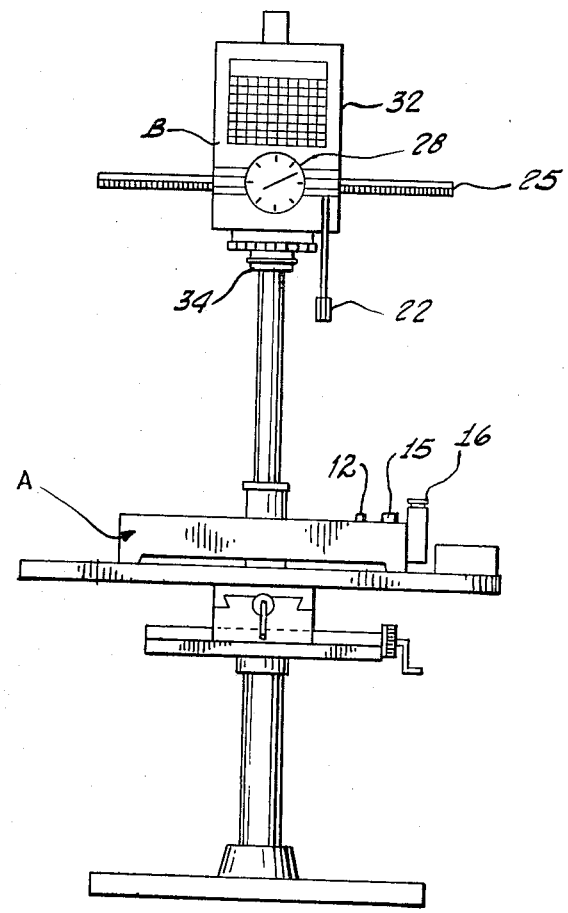
Figure 2:
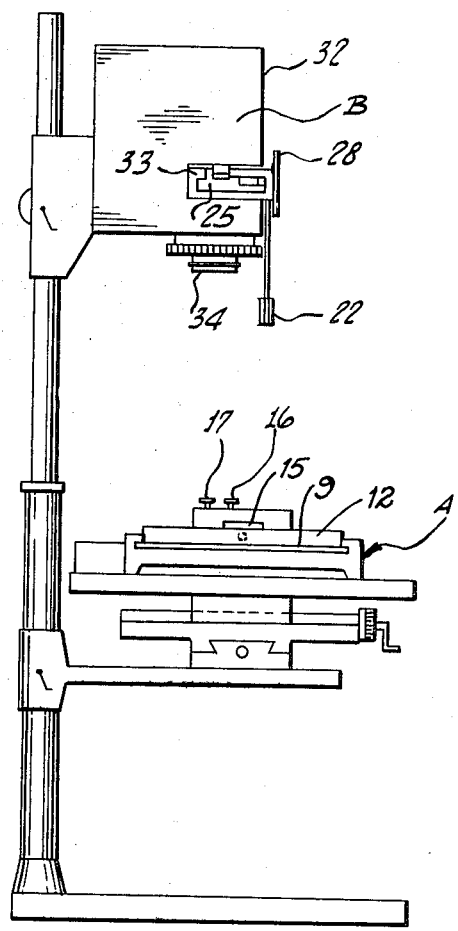
FIG. 2 is a side view of FIG. 1.
Figure 3:
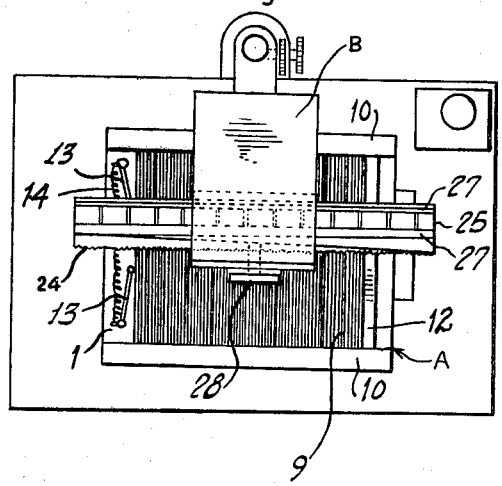
FIG. 3 is a plan view of FIG. 1.

Referring now to FIGS. 1 and 2 as well as 10 to 13, an enlarger head B is disposed above easel A, having a film carrier 25 including a holder 33. Carrier 25 has on one outer side wall of the base thereof a rack 24 extending longitudinally of carrier 25. The base member of the carrier along its center line has a rectangular window 26 which will lie over an enlarging lens 34 in head B. An axial lever 29 of a micrometer 28 engages a guide surface 27'' formed on an upstanding frame member 27.

A film-advance turning handle 22 rotates a coupling gear 23 which engages rack 24 to advance carrier 25. Numeral 27' indicates a pair of parallel guide tracks on the inner wall of window 26. These tracks guide the photographic film 30 which was previously taken by the afore-mentioned special camera. Numeral 32 identifies a box of enlarger head B (see FIGS. 1 and 2). 36 is a timer controlling the exposure time; 37 is an electric energy source and 38 is a relay in an electric circuit 39 (see FIG. 4).

Figure 12:
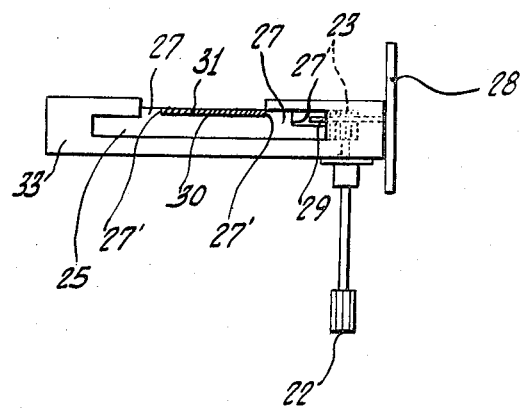
FIG. 12 is a left-hand side view of FIG. 10.
Figure 13:
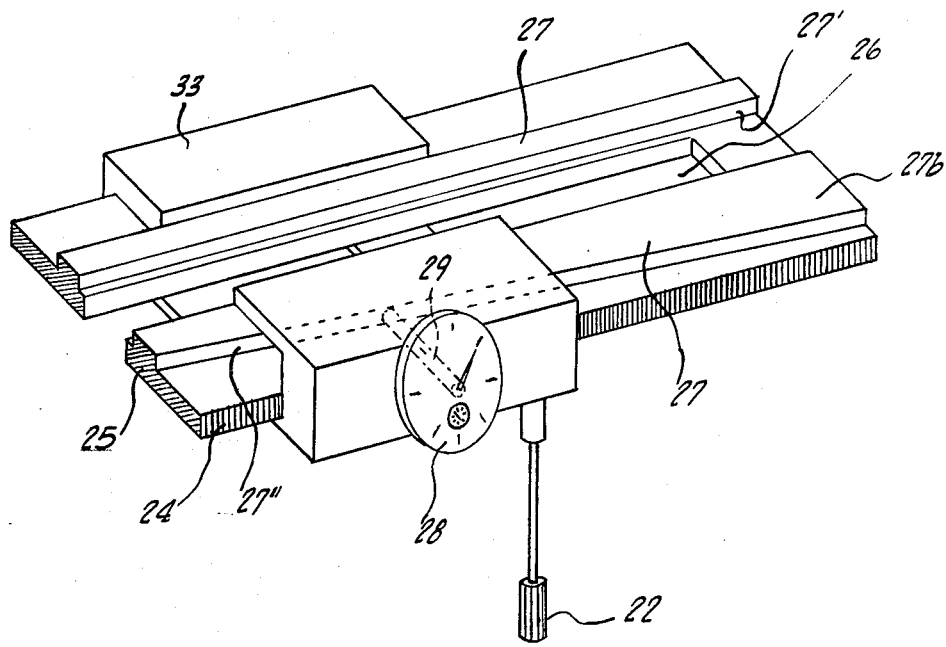
FIG. 13 is an oblique view of the film carrier engaged with the carrier holder.

Carrier 25 is slid from enlarger head B, a film strip inserted into guide tracks 27' and a pressure glass 31 applied thereover (see FIG. 12). The carrier 25 is inserted into holder 35 of head B, with the first frame 30a of a series of frames on the film 30 in position for the first exposure. Photosensitive film 2 is placed between backing plate 1 and glass sheet 4 on top of which is positioned lenticular screen 9.

As in normal enlarging practice, timing the exposure is necessary, and it is therefore advisable to shield off the light from the sensitive film at this stage. In order to do so, a light-proof sheet is placed over screen 9. Light-source lamp 35 is lit and enlarger lens 34 focused. When this is completed, micrometer 28 is set to zero, correct exposure time being also determined. The light-proof sheet protecting the film is now removed.

The enlarging process is achieved as follows. Thumb piece 17 of easel A is firmly pressed down. This initiates a chain of actions, including moving wheel 7 in a clockwise direction to an extent as regulated by knob 16, which in turn moves spindle 8 axially due to its threaded connection with boss 15 which in turn pushes lenticular screen 9 forward in small increments, and bar 6 returns to its original position where it touches microswitch 5 which in turn actuates timer 36 for the first exposure.

When the exposure is completed, the next frame of the photographic film 30 is precisely moved into position by operating handle 22 until micrometer 28 reaches the required reading as given on a table on box 32.

The light image of the first exposure having passed through screen 9 produces a series of minute lineations, when it strikes the emulsion of the film, each lineation or strip area occupying however only a fraction of the width of one lenticular lens element. The light image from the next exposure will give a second series of lineations which lie parallel to those of the first series. The entire width of the film area, as covered by one lenticular lens element, will become fully exposed when all frames are exposed.

This converting of a series of two-dimensional photographs into a single direct-vision three-dimensional photograph is achieved uniquely by virtue of the method of moving the lenticular screen, contained in the special three-dimensional composing easel, in a series of micrometric moves while the set of frames of the exposed film in the enlarger head remains stationary in the carrier, after having been accurately positioned by means of the carrier advance knob. It should be noted that the film in the special three-dimensional composing easel remains completely stationary.

What I claim is:

1. An enlarging device for direct-vision three-dimensional pictures, comprising an enlarger head, a film carrier slidably mounted in said head and including a base member having a rack on one side wall thereof, a window being provided through said carrier, means for mounting a photographic film over said window, advancing means engaging said rack, means to actuate said advancing means to move said carrier, an inclined sliding guide on said carrier, a micrometer relative to which said carrier may move, and an arm on said micrometer, said arm contacting said guide, whereby movement of said carrier moves said guide relative to said arm which in turn moves to follow said guide and changes the reading on said micrometer.

2. An enlarging device for direct-vision three-dimensional pictures, comprising an enlarger head, a film carrier slidably mounted in said head and including a base member having a rack on one side wall thereof, a window being provided through said carrier, means for mounting a photographic film over said window, advancing means engaging said rack, means to actuate said advancing means to move said carrier, an easel, means to mount the film on said easel, a lenticular image-converting screen having a multiple optical axis, movably mounted between the film and said head, and means to move said screen so as to arrange linear pictures on the film parallel to each other.

3. An enlarging device for direct-vision three-dimensional pictures, comprising an enlarger head, a film carrier slidably mounted in said head and including a base member having a rack on one side wall thereof, a window being provided through said carrier, means for mounting a photographic film over said window, advancing means engaging said rack, means to actuate said advancing means to move said carrier, an easel, means to mount the film on said easel, a lenticular screen movably mounted between the film and said head, and means to move said screen, wherein the latter includes a screw spindle, a ratchet wheel, and means to actuate said wheel to turn said spindle to move said screen.

4. The enlarging device as defined in claim 3, further comprising a switch adapted for actuation by the movement of said wheel, said switch in turn actuating a light source in said head.

5. An enlarging device for direct-vision three-dimensional pictures, comprising a film carrier including a base member with an outer side wall having a rack extending longitudinally of said base member, a window being provided through said base member, a frame adjacent said window forming a guide track to hold a photographic film with direct-vision three-dimensional pictures, a sloped sliding guide on said base member, and an easel including a backing plate for mounting a photosensitive film, a glass sheet fitted to said backing plate so that the photosensitive film lies between said backing plate and said glass sheet, and a lenticular screen movably mounted to said glass sheet, a screw spindle contacting an edge of said screen, an increment wheel, wherein the turning of said wheel advances said spindle and said screen, an enlarger projector in which said carrier is slidably mounted, a micrometer having a lever, the latter engaging said guide, and a handle connected with said rack to advance said carrier, said easel being positioned spaced from an enlarging lens of said projector, whereby a set of pictures may be projected onto the photosensitive film when laid under said screen.

* * * * *